United States Patent [19]

Jones et al.

[11] Patent Number: 4,533,329
[45] Date of Patent: Aug. 6, 1985

[54] EDUCATIONAL DEVICE FOR TEACHING THE PROPER PLACEMENT OF INFORMATION

[75] Inventors: Corey N. Jones, Severn; Patricia A. Hawkins, Laurel, both of Md.

[73] Assignee: PSI Associates, Inc., Washington, D.C.

[21] Appl. No.: 624,735

[22] Filed: Jun. 26, 1984

[51] Int. Cl.$^3$ ............................................. G09B 19/00
[52] U.S. Cl. ................................................... 434/219
[58] Field of Search ................. 434/219, 117; 211/126

[56] References Cited

U.S. PATENT DOCUMENTS

| | | | |
|---|---|---|---|
| 870,789 | 11/1907 | Lyon | 211/126 |
| 2,415,342 | 2/1947 | Donner | 434/171 |
| 2,913,836 | 11/1959 | Strunk | 434/117 |
| 3,024,541 | 3/1962 | Byrum | 434/172 |
| 3,392,460 | 7/1968 | Schure et al. | 434/349 |
| 3,579,867 | 5/1971 | Kuhn | 434/117 |

Primary Examiner—William H. Grieb
Attorney, Agent, or Firm—Banner, Birch, McKie & Beckett

[57] ABSTRACT

This invention relates to an educational board teaching tool for teaching young children or persons with learning disabilities the skill of applying information in a specific, desired position to an envelope, letter, box, or other information-receiving element. The invention comprises a board having a top compartmentalized surface. Some of the compartments include templates which guide an information receiving element into its desired position. The templates also retain the element in position and guide the placement of information onto the element. The educational device of the present invention may also include retaining means for retaining the board on a work surface. Preferably, the retaining means includes a retaining rib on the bottom surface of the board which fits into a complementary groove on a work table or work station at which the board will be retained.

16 Claims, 4 Drawing Figures

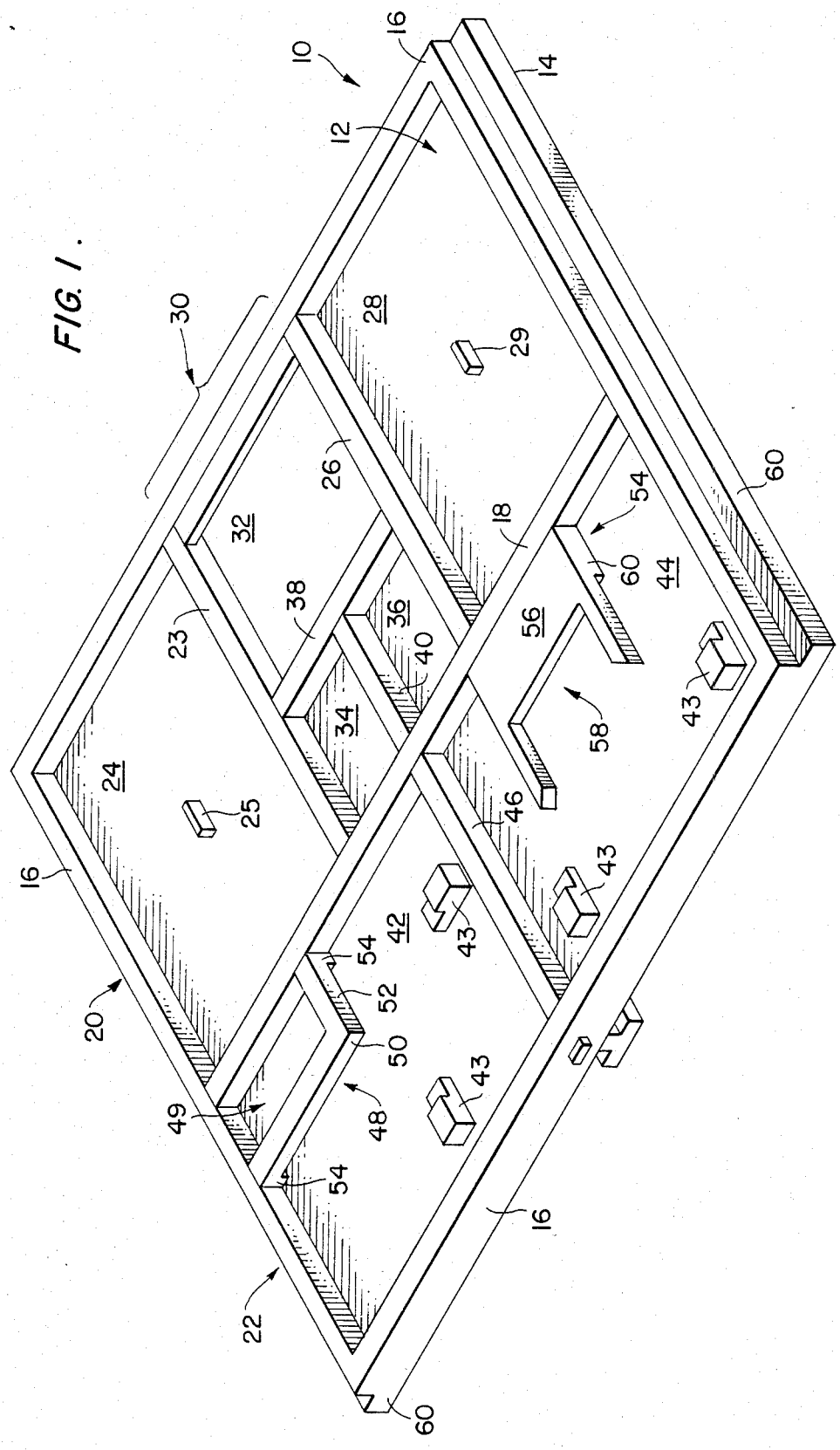

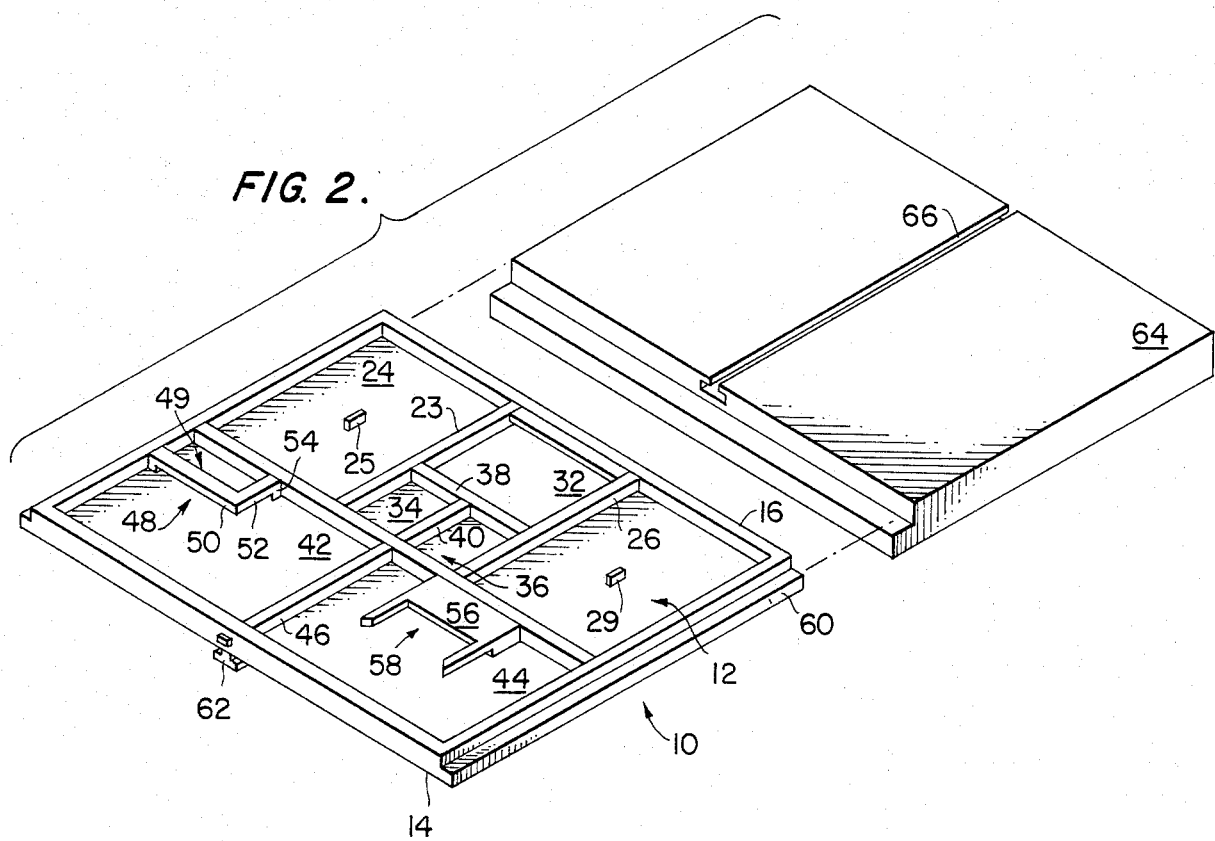

EDUCATIONAL DEVICE FOR TEACHING THE PROPER PLACEMENT OF INFORMATION

BACKGROUND OF THE INVENTION

This invention relates to an educational device for teaching basic, practical skills for a specific purpose. Specifically, this invention relates to an educational board teaching tool for teaching young children, handicapped persons or persons with learning disabilities the skill of applying information in a specific, desired position to an envelope, letter, box, or other information-receiving element.

Educational devices for teaching various basic learning skills are well-known. For example, U.S. Pat. No. 2,415,342 discloses a block and base educational system for teaching reading and arithmatic in which the blocks have projections which fit into recesses on the base. The system of projections and recesses is arranged such that the blocks will fit only in a single position on the base, thus teaching proper numerical arrangement or spelling. U.S. Pat. No. 3,024,541 discloses a spelling board which includes a plurality of rectangular depressions formed on a base board. Rectangular sections of cardboard, or blocks, on which are printed individual letters of the alphabet and the corresponding numbers 1–26 are placed within the depressions. Other such educational teaching devices are also well-known.

The present invention provides an educational device which may be used by young children, handicapped persons, or persons with a learning disability. The educational device of the present invention is intended to each a specific skill, that being the application of information, such as a return address and a mailing address, to a specific, desired position on an information-receiving element, for example, an envelope or letter. It will be appreciated, of course, that other types of information can be applied to other forms of information receiving elements. The term "information" is intended to include both written and graphic or pictorial information. The term "information-receiving element" is intended to include, without limitation, paper, envelopes, boxes, flyers, and the like. This skill, while seemingly simple, involves a number of complex motor skills and pattern recognition skills. For example, an envelope must be oriented properly so that the return address will be placed in the upper left-hand corner and the return address must be written or otherwise applied so that it is readable with the envelope so oriented. Then, while maintaining the same orientation, a mailing address must be written or otherwise applied in the center of the envelope so that it also is readable. The present invention not only teaches a basic skill, but, when used by handicapped or learning disabled persons, can be used for vocational training or as a tool for performing a work assignment.

The present invention provides a self-contained educational device for teaching the proper orientation and placement of information in a specific, desired position on an information-receiving element. The invention includes a board having a top surface and a bottom surface. The top surface of the board is divided into a plurality of separate compartments. These compartments include a blank compartment for holding a supply of blank information-receiving elements to which information will be applied. From the blank supply compartment a single blank information-receiving element is removed and placed in a first compartment in which a first piece of information is applied. The first compartment includes means for properly positioning the blank element within the compartment, and also includes means for retaining the element in its position and for guiding the placement of the information onto the proper position on the element. In a preferred form, the educational device also includes a second compartment for applying a second piece of information to the element. The second compartment includes means for properly positioning the element within the compartment, and also includes means for retaining the element in its position and for guiding the placement of the second piece of information onto the proper position on the element. It will be appreciated that additional information-applying compartments may be formed on the board to meet the requirements of a particular application or teaching need. The board may further have a storage compartment for storing the elements after they have been processed. In a preferred form, the invention also has a separate compartment for retaining the information-applying work pieces, such as a rubber stamp, an ink pad, or labels.

The educational device of the present invention may also include retaining means for retaining the board on a work surface. Preferably, the retaining means includes a retaining rib on the bottom surface of the board which fits into a complementary groove on a work table or work station at which the board will be retained.

BRIEF DESCRIPTION OF THE DRAWINGS

FIG. 1 is a general perspective view of an educational device according to the present invention.

FIG. 2 is an exploded perspective view of an educational device and retaining board according to the present invention.

FIG. 3 is a bottom plan view of an educational device according to the present invention.

FIG. 4 is a partial cut away bottom view of an educational device according to the present invention.

DETAILED DESCRIPTION OF THE PREFERRED EMBODIMENT

The present invention comprises a generally flat board 10 having a top surface 12 and a bottom surface 14.

In a preferred form of the invention the board is sized so that it is easily handled by a single person and will fit on a desk-sized work station.

Board 10 is surrounded by a raised rim or border 16 which extends around the periphery of top surface 12 and projects upwardly therefrom. Dividing strips divide top surface 12 into a plurality of separate compartments, as will be described below.

In a preferred embodiment of the invention, the invention is used to teach and facilitate the proper application and placement of a return address and a mailing address to a business letter sized envelope. Thus, two separate information applying compartments are created on board 12. It will be appreciated by those of ordinary skill in the art that the information-receiving element can be something other than an envelope, the information to be applied can be other than a return address and mailing address, and that more or fewer than two separate information-supplying compartments may be provided.

A dividing strip 18 extends horizontally across the entire top surface 12 of board 10. Each end of dividing strip 18 abuts against rim 16, as shown in FIG. 1. Dividing strip 18 divides top surface 12 into an upper portion 20 and a lower portion 22. In the preferred form of the invention shown in FIG. 1, upper portion 20 of board 10 is the "supply and storage" section where an inventory of blank envelopes to be processed, the basic information-applying tools and equipment used during processing, and completed envelopes are stored. Bottom portion 22 of board 10 is the "operating" portion where actual processing of envelopes takes place.

In the preferred form of the invention, a dividing strip 23 extends from the top peripheral rim 16 to dividing strip 18 thus dividing top portion 20 into a first compartment 24 for retaining an inventory of envelopes to be processed using the present invention. A guide tab 25 divides compartment 24 into two separate halves, each accommodating a separate stack of envelopes. A third dividing strip 26 also extends from the top peripheral rim 16 to dividing strip 18 and is parallel to and spaced from dividing strip 23. Dividing strip 26 thus defines, with raised rim 16 and dividing strip 18, a compartment 28 for storing the envelopes after processing. A guide tab 29 divides compartment 28 into two separate halves, each accommodating a separate stack of envelopes.

In a preferred form of the invention, the space between dividing strips 23 and 26 forms a compartment 30 which is preferably used to store and retain the working supplies used to apply information to the envelopes. As shown in FIG. 1, compartment 30 is preferably divided into three sub-compartments 32, 34 and 36 by dividing strips 38 and 40. As shown in FIG. 1, dividing strip 38 extends horizontally between dividing strips 23 and 26, whereas dividing strip 40 extends between dividing strip 38 and dividing strip 18, thus forming sub-compartments 32, 34, and 36. In one form of the invention, shown in FIG. 1, compartment 32 is used, for example, to retain an ink pad of conventional design which will be used with a rubber stamp, retained within sub-compartment 34. A supply of address labels may be retained in compartment 36. Although an ink pad, rubber stamp, and labels are referred to, they are used for example only with respect to this description of a preferred embodiment. Any other information-applying tool or medium may be used. While there is an enhanced educational benefit from using two different information-applying devices, the same type of device may be used.

It will be appreciated that the upper portion 20 may be structured in any suitable configuration to accommodate particular teaching needs or space constraints. Accordingly, if it is desired to use a board of smaller size, the working supply compartment 30 may be eliminated and only inventory and storage compartments 26 and 28 may be provided. Alternatively, the invention may be used only with an operating portion 22 on board 12.

Operating section 22 of board 10 is divided preferably into two separate compartments 42 and 44 by a dividing strip 46 which extends from dividing strip 18 to the bottom peripheral rim 16. Guide tabs 43 within compartments 42 and 44 generally serve to position an envelope within the compartments. More than two such compartments may be provided, however.

In the form of the invention shown in FIG. 1, compartment 42 is used for placing a return address on an envelope in the upper left-hand corner of the envelope by means of a rubber stamp. Compartment 42 includes a retaining and guiding template 48, which retains the envelope in place within compartment 42 and guides the rubber stamp to its proper position on the envelope. Template 48 is formed by a first dividing strip 50, which extends horizontally from peripheral rim 16, and a second dividing strip 52, which extends vertically downward from dividing strip 18 and mates with dividing strip 50 to define a generally rectangular template window 49 in the upper left corner of compartment 42. Of course, template 48 may be made of any suitable shape or size and put within any desired position with compartment 42 to accommodate specific teaching needs and objectives.

As shown in FIG. 1, dividing strips 50 and 52 are formed with a downwardly extending leg 54, which serves to raise the dividing strips 50 and 52 sufficiently above top surface 12 of board 10 so that an envelope can be placed under template 48 with a portion of the envelope exposed within template window 49.

Compartment 44, as shown in FIG. 1, is preferably used for applying a mailing address to an envelope in the proper position. Compartment 44 includes a retaining and guiding template 54, which retains the envelope in place within compartment 44 and guides a mailing label to its proper position on the envelope. The retaining and guiding template 54 in compartment 44 in a preferred form comprises a generally rectangular body 56 projecting vertically downward from dividing strip 18 toward peripheral rim 16. Body 56 extends downwardly from dividing strip 18 a sufficient distance so that a cut-out template area 58 is formed in body 56 at the appropriate position within compartment 44 for applying a mailing address to an envelope retained within compartment 44. Retaining and guiding template 54 includes a downwardly extending leg 60 formed adjacent to dividing step 18, which serves to raise template body 56 sufficiently above top surface 12 of board 10 so that an envelope can be placed under template 54 with a with a portion of the envelope exposed within template window 58 and held in place while a mailing address label is applied through template window 58.

In a preferred form, the educational device will be placed on a desk, table, or other work surface. It is desirable to have positive means for retaining the educational device on the table or work surface. A shown in FIG. 1, board 10 may be formed with horizontal flanges 60 on each side of board 10. Flanges 60 may be placed under retaining strips (not shown) on a work table. Board 10 may alternatively be retained in place by a peg and slot arrangement in board 10 and the work surface. Board 10 may be secured to a work table by an elastic strap, not shown. The elastic strap would be removably fixed to the outside surface of peripheral border 16 on opposite ends of board 10 so that it could pass under the work surface and thus retain the board in place. Alternatively, and preferably, as shown in FIG. 2, board 10 may have a retaining rib 62 formed on bottom surface 14.

In a preferred form, retaining rib 62 will be securely fixed to bottom surface 14 and will have a cross-section of an inverted "T". This retaining rib is intended to be slid into a retaining groove of complementary shape formed on the work table (not shown) so that board 10 will be positively positioned on and securely held to the work table. Alternatively, in order to avoid the need to cut grooves into a work table that may have other uses, a separate retaining board 64 may be provided. Retaining board 64 has an inverted T-shaped groove 66 cut into its surface. Groove 66 is sized and shaped to be complementary to retaining rib 62 so that retaining rib 62 may be slid into and retained within groove 66. Retaining board 64 is designed to be of sufficient mass to serve to retain board 12 in position on a work table.

In operation, retaining rib 62 is secured in a retaining groove in either a retaining board or directly in a work table. A supply of blank envelopes is placed in compartment 24, an ink pad is placed in compartment 32, a rubber stamp having a return address imprinted thereon is placed in compartment 34, and a supply of mailing labels is placed in compartment 36. The person using the educational device takes a blank letter or envelope from compartment 24 and inserts it in compartment 42. As shown in FIG. 1, compartment 24 will retain the supply of blank material to be processed in a generally vertical orientation whereas compartment 42 requires material to be rotated 90° and placed in a generally horizontal configuration. Thus, the dividing strips outlining and defining compartment 42 and guide tabs 43 will serve to ensure that the blank envelope is properly positioned within compartment 42. The envelope to be processed is slid under template 48. A portion of the envelope or letter will thus be exposed within template window 49. Template 48 also serves to retain the letter or envelope in proper position within compartment 42. The user then takes the rubber stamp from compartment 34, which preferably is the supply compartment closest to compartment 42, and places the rubber stamp in the template window 49 so that a return address will be placed in a proper position on the envelope or letter. The retaining and guiding template 48 is shown in FIG. 1 as being generally rectangular. However, both the stamp and template can be formed of other shapes so that the stamp will fit within the template in only one direction to ensure that the return address is placed in the proper orientation within template window 49.

After placing the return address on the envelope or letter, the user returns the stamp to compartment 34, removes the envelope or letter from compartment 42, and inserts the envelope in compartment 44. The envelope is inserted under template 54, which serves to retain the envelope within compartment 44. Guide tabs 43 further serve to properly position the envelope. A portion of the envelope is exposed within template window 58 and defines the proper position for placing a mailing address on the envelope. The user takes a mailing label from compartment 36, which is the closest supply compartment to compartment 44, and places it on the letter or envelope within window 62. As shown, template window 58 is rectangular, but other shapes may be used to ensure that the label is placed on the envelope in the proper orientation.

After applying the mailing label in section 44, the user removes the envelope and places the completely processed envelope in section 28.

Although a preferred form of the invention has been shown and described, the invention is not intended to be limited thereby. Numerous modifications and changes will be obvious to those of ordinary skill. For example, although it is desirable to have tray 10 be self-contained in that it contains the blank material to be processed and the supplies, such as the ink pad, rubber stamp and mailing labels, the supply section of tray 10 may be eliminated and these supplies may be separately provided. Also, one or more of the compartments described above may be eliminated to provide a more basic device which includes only one or two of the steps involved. Similarly, while the invention has been described with the use of a rubber stamp and mailing labels for applying information to an envelope, other forms of applying information, other information, and other forms of information-receiving elements may all be used. The invention is defined only by the following claims.

We claim:

1. An educational device comprising:
   a board having a top surface and a bottom surface, said top surface divided into a plurality of compartments, including
   a holding compartment for holding a supply of information-receiving elements;
   a processing compartment for positioning information receiving elements from said holding compartment, said processing compartment having retaining and guide means for retaining an information-receiving element and for guiding the placement of information onto a specific, desired position on the information-receiving element; and
   a storage compartment for storing information-receiving elements processed in said processing compartment.

2. The device as recited in claim 1 further comprising securing means for securing said board to a work surface.

3. The device as recited in claim 2 wherein said securing means comprise flanges on opposite sides of said board.

4. The device of claim 1 further comprising a second processing compartment for positioning information-receiving elements, said second processing compartments having retaining and guiding means for retaining an information-receiving element and for guiding the placement of information onto a second specific, desired position on the information-receiving element.

5. An educational device comprising:
   a board having a top surface and a bottom surface, said top surface divided into a plurality of compartments, including
   a blank compartment for holding blank elements to be processed;
   an information applying compartment, said information applying compartment having means for positioning blank elements from said blank compartment to be processed, said information applying compartment further having guiding and retaining means for retaining elements to be processed within said information applying compartment and for guiding an information applying tool into proper position with respect to blank elements to be processed; and
   an information applying tool compartment for retaining an information applying tool to be placed into said guiding means of said information applying compartment.

6. The device as recited in claim 5 further comprising a storage compartment for storing processed elements.

7. The device as recited in claim 5 further comprising a second information applying compartment, said second information applying compartment having means for positioning blank elements to be processed, said second information applying compartment further having retaining and guiding means for retaining elements to be processed within said second information applying compartment and for guiding a second information applying tool into proper position with respect to blank elements to be processed.

8. The device as recited in claim 7 further comprising a storage compartment for storing a second information applying tool.

9. The device as recited in claim 5 further comprising securing means for securing said board on a work surface.

10. The device as recited in claim 9 wherein said securing means comprises a retaining rib on said bottom surface of said board, said retaining rib adapted to be retained within a retaining groove on a work surface.

11. The device as recited in claim 9 wherein said securing means comprise flanges on opposite sides of said board.

12. An educational device comprising:
   a board having a top surface and a bottom surface, said top surface divided into a plurality of compartments, including
      a blank compartment for holding blank material to be processed;
      a first information applying compartment, said first compartment having means for positioning blank material to be processed from said blank compartment, said first compartment further having retaining and guiding means for retaining material to be processed within said first compartment and for guiding a first information applying tool into proper position with respect to blank material to be processed;
      a first tool storage compartment for retaining a first information applying tool to be placed in said guiding and retaining means of said first compartment;
      a second information applying compartment, said second compartment having means for positioning blank material to be processed, said second compartment further having retaining and guiding means for retaining material to be processed within said second compartment and for guiding a second information applying tool into proper position with respect to material to be processed;
      a second tool storage compartment for retaining a second information applying tool to be placed in said guiding and retaining means of said second compartment; and
      a storage compartment for storing processed material.

13. The device as recited claim 12 further comprising securing means for securing said board to a work surface.

14. The device as recited in claim 13 wherein said securing means comprises a retaining rib on said bottom surface of said board, said retaining rib adapted to be retained within a retaining groove on a work surface.

15. The device as recited in claim 13 wherein said securing means comprise flanges on opoosite sides of said board.

16. An educational device comprising:
   a board having a top surface and a bottom surface, said top surface divided into a plurality of compartments, including
      a holding compartment for holding a supply of information-receiving elements;
      a processing compartment for processing information-receiving elements, said processing compartment having retaining and guide means for retaining an information-receiving element and for guiding the placement of information onto a specific, desired position on the information-receiving element;
      a storage compartment for storing information-receiving elements processed in said processing compartment; and
      a retaining rib on said bottom surface of said board, said retaining rib adapted to be retained within a retaining groove on a work surface.

* * * * *